United States Patent
Yanke et al.

(10) Patent No.: US 11,246,259 B2
(45) Date of Patent: Feb. 15, 2022

(54) LOCKING ASSEMBLY FOR AGRICULTURAL COMBINE HARVESTING HEAD

(71) Applicant: Deere & Company, Moline, IL (US)

(72) Inventors: Bryan R. Yanke, Eldridge, IA (US);
Duane M. Bomleny, Geneseo, IL (US);
Benjamin M. Lovett, Colona, IL (US)

(73) Assignee: DEERE & COMPANY, Moline, IL (US)

( * ) Notice: Subject to any disclaimer, the term of this patent is extended or adjusted under 35 U.S.C. 154(b) by 376 days.

(21) Appl. No.: 16/396,313

(22) Filed: Apr. 26, 2019

(65) Prior Publication Data

US 2020/0337227 A1   Oct. 29, 2020

(51) Int. Cl.
*A01D 34/24* (2006.01)
*A01D 34/28* (2006.01)
*A01D 34/04* (2006.01)
A01D 34/14 (2006.01)

(52) U.S. Cl.
CPC .......... *A01D 34/246* (2013.01); *A01D 34/04* (2013.01); *A01D 34/283* (2013.01); *A01D 34/14* (2013.01)

(58) Field of Classification Search
CPC .... A01D 34/246; A01D 34/283; A01D 34/04; A01D 34/14; A01D 41/141; A01D 41/127; A01D 41/145; A01D 41/14
See application file for complete search history.

(56) References Cited

U.S. PATENT DOCUMENTS

| | | | | |
|---|---|---|---|---|
| 4,136,508 A | * | 1/1979 | Coleman | A01D 41/141 56/208 |
| 4,206,582 A | * | 6/1980 | Molzahn | A01D 57/00 56/15.8 |
| 5,562,167 A | * | 10/1996 | Honey | A01B 73/00 16/18 R |
| 6,789,379 B2 | * | 9/2004 | Heidjann | A01D 41/12 56/10.2 E |
| 7,661,251 B1 | * | 2/2010 | Sloan | A01D 41/145 56/10.2 E |

(Continued)

OTHER PUBLICATIONS

AGCO CORP, "9250 DynaFlex Header Explained," <https://www.youtube.com/watch?v=rSfP4vTTe_0> published Dec. 3, 2009.

*Primary Examiner* — Arpad Fabian-Kovacs
(74) *Attorney, Agent, or Firm* — Michael Best & Friedrich LLP

(57) ABSTRACT

A harvesting head for an agricultural combine includes a frame and a support arm coupled to the frame. The support arm is configured to move between an unlocked state in which the support arm is moveable relative to the frame and a locked state in which the support arm is fixed relative to the frame. The harvesting head includes cutting teeth supported by the support arm relative to the frame. The cutting teeth are configured to move relative to the support arm in a reciprocating motion along a longitudinal axis of the frame. The harvesting head includes a gauge member coupled to the frame. The gauge member is configured to sense a height of the frame relative to a surface. The harvesting head includes a control assembly configured to move the support arm into the locked state based on the height of the frame relative to the surface.

20 Claims, 8 Drawing Sheets

(56) References Cited

U.S. PATENT DOCUMENTS

| | | | |
|---|---|---|---|
| 7,971,420 B1* | 7/2011 | Bollin | A01D 41/145 |
| | | | 56/208 |
| 8,245,489 B2 | 8/2012 | Talbot | |
| 9,125,343 B2* | 9/2015 | Duquesne | A01D 41/16 |
| 9,380,744 B2 | 7/2016 | Dilts | |
| 9,980,431 B2* | 5/2018 | Long | A01D 41/127 |
| 10,278,330 B2* | 5/2019 | Silver | A01F 12/44 |
| 2006/0242935 A1* | 11/2006 | Rayfield | A01D 41/141 |
| | | | 56/10.2 E |
| 2010/0281837 A1* | 11/2010 | Talbot | A01D 41/141 |
| | | | 56/10.2 E |
| 2014/0041351 A1* | 2/2014 | Bollin | A01D 41/141 |
| | | | 56/10.2 E |
| 2014/0237980 A1* | 8/2014 | Verhaeghe | A01D 41/14 |
| | | | 56/320.1 |
| 2015/0033692 A1 | 2/2015 | Schroeder et al. | |
| 2015/0271999 A1* | 10/2015 | Enns | A01D 41/141 |
| | | | 700/275 |
| 2016/0183461 A1* | 6/2016 | Neudorf | A01D 41/14 |
| | | | 56/158 |
| 2018/0070531 A1* | 3/2018 | Long | A01D 41/141 |
| 2018/0098491 A1* | 4/2018 | Long | A01D 41/141 |
| 2018/0228080 A1* | 8/2018 | Fay, II | G01B 5/14 |
| 2018/0368317 A1* | 12/2018 | Schulze Selting | A01D 34/008 |
| 2019/0029173 A1* | 1/2019 | Noll | A01D 41/127 |
| 2019/0029175 A1* | 1/2019 | Talbot | A01D 41/145 |
| 2019/0200523 A1* | 7/2019 | Fay, II | A01D 41/145 |
| 2019/0230855 A1* | 8/2019 | Reed | A01D 41/141 |
| 2019/0230858 A1* | 8/2019 | Shearer | A01D 41/145 |
| 2020/0344950 A1* | 11/2020 | Brimeyer | A01D 41/145 |
| 2020/0352101 A1* | 11/2020 | Pierson | A01D 41/145 |
| 2021/0153434 A1* | 5/2021 | Hunt | A01D 41/06 |

* cited by examiner

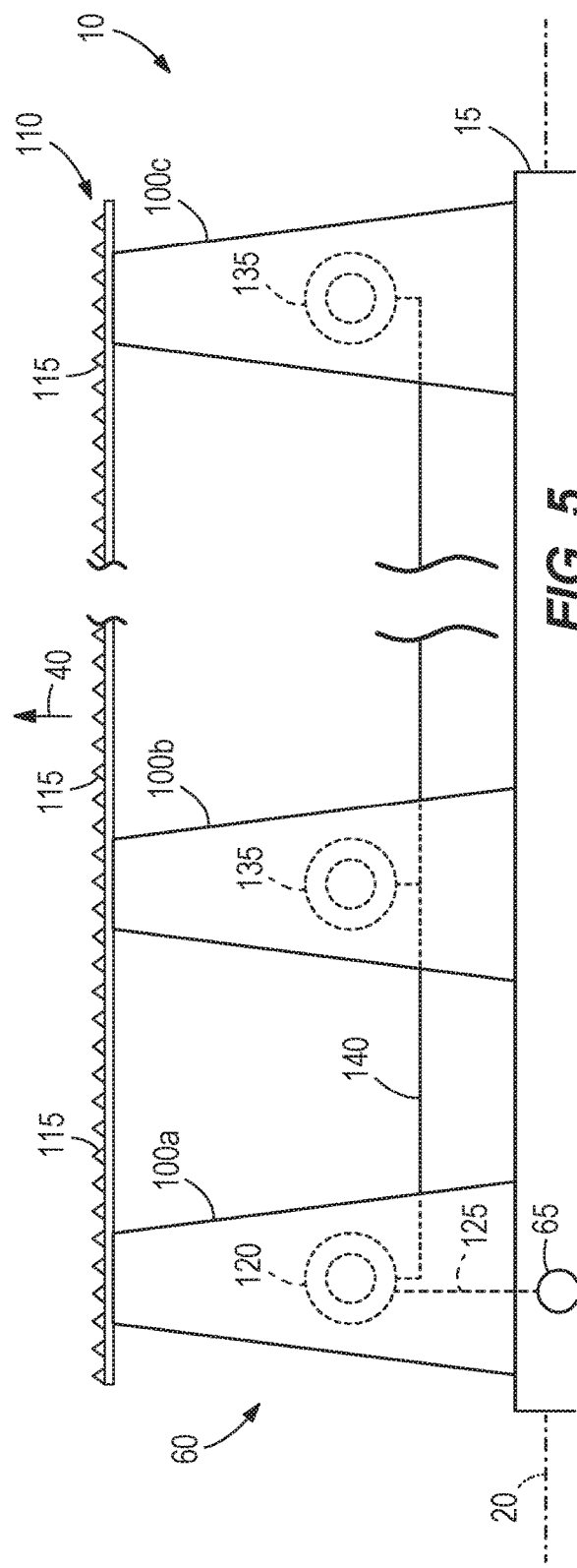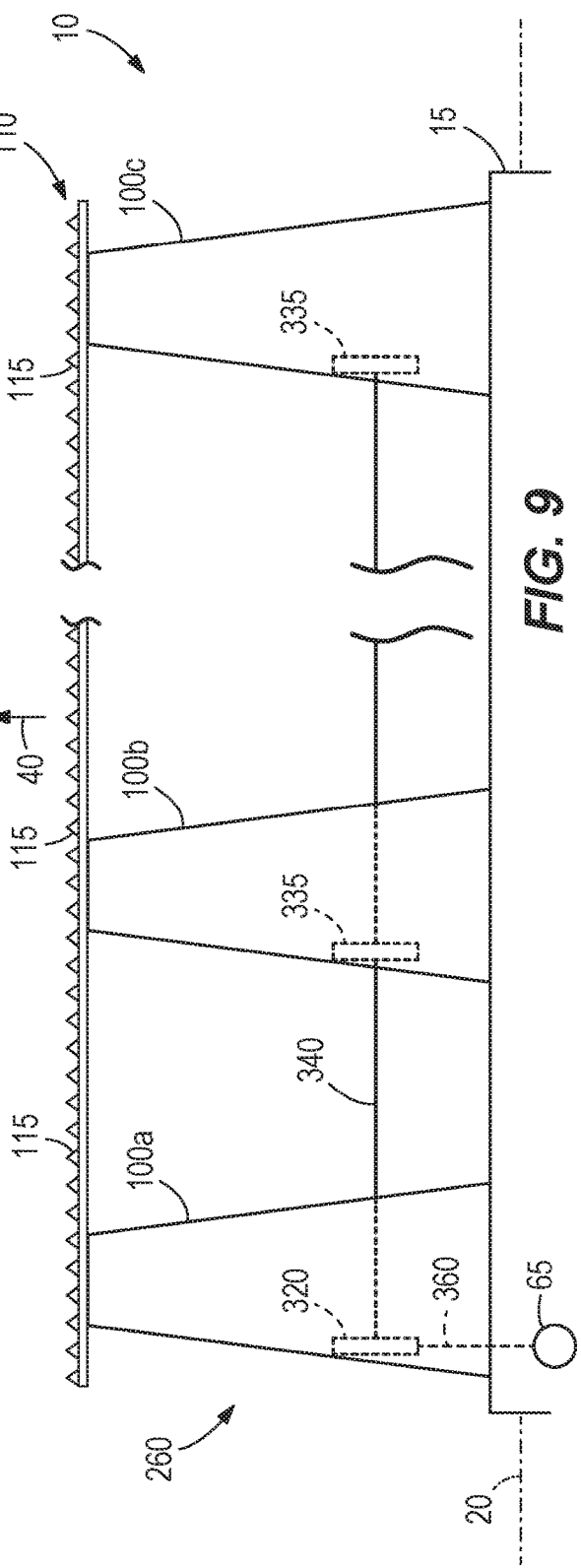

LOCKING ASSEMBLY FOR AGRICULTURAL COMBINE HARVESTING HEAD

BACKGROUND

The present disclosure generally relates to agricultural combines. More particularly, the disclosure relates to a locking assembly for a flexible cutting bar of agricultural harvesting heads.

SUMMARY

In one aspect, a harvesting head is for an agricultural combine. The agricultural combine is supported on a surface. The harvesting head includes a frame configured to move between a raised position in which the frame is spaced from the surface and a lowered position in which the frame engages the surface. The harvesting head includes a support arm coupled to the frame. The support arm is configured to move between an unlocked state in which the support arm is pivotable relative to the frame and a locked state in which the support arm is fixed relative to the frame. The harvesting head includes cutting teeth supported by the support arm relative to the frame. The cutting teeth are configured to move relative to the support arm in a reciprocating motion along a longitudinal axis of the frame. The harvesting head includes a gauge member coupled to the frame. The gauge member is configured to engage the surface to sense a height of the frame relative to the surface. The harvesting head includes a control assembly configured to move the gauge member relative to the frame. The control assembly is also configured to move the support arm into the locked state based on a position of the gauge member relative to the frame.

In another aspect, a harvesting head is for an agricultural combine. The agricultural combine is supported on a surface. The harvesting head includes a frame and a support arm coupled to the frame. The support arm is configured to move between an unlocked state in which the support arm is moveable relative to the frame and a locked state in which the support arm is fixed relative to the frame. The harvesting head includes cutting teeth supported by the support arm relative to the frame. The cutting teeth are configured to move relative to the support arm in a reciprocating motion along a longitudinal axis of the frame. The harvesting head includes a gauge member coupled to the frame. The gauge member is configured to sense a height of the frame relative to the surface. The harvesting head includes a control assembly configured to move the support arm into the locked state based on the height of the frame relative to the surface.

In yet another aspect, a harvesting head is for an agricultural combine. The agricultural combine is supported on a surface. The harvesting head includes a frame and a support arm coupled to the frame. The support arm is configured to move between an unlocked state in which the support arm is moveable relative to the frame and a locked state in which the support arm is fixed relative to the frame. The harvesting head includes cutting teeth supported by the support arm relative to the frame. The cutting teeth are configured to move relative to the support arm in a reciprocating motion along a longitudinal axis of the frame. The harvesting head includes a gauge member coupled to the frame. The gauge member is configured to engage the surface to sense a height of the frame relative to the surface. The harvesting head includes a control assembly configured to move the support arm into the locked state based on a position of the gauge member relative to the frame.

In addition, other aspects of the disclosure will become apparent by consideration of the detailed description and accompanying drawings.

BRIEF DESCRIPTION OF THE DRAWINGS

FIG. 5 is a top view of a portion of the agricultural harvesting head unit of FIG. 1 illustrating the hydraulic locking assembly extending along a length of the agricultural harvesting head unit.

FIG. 9 is a top view of a portion of the agricultural harvesting head unit of FIG. 1 illustrating the mechanical locking assembly extending along the length of the agricultural harvesting head.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
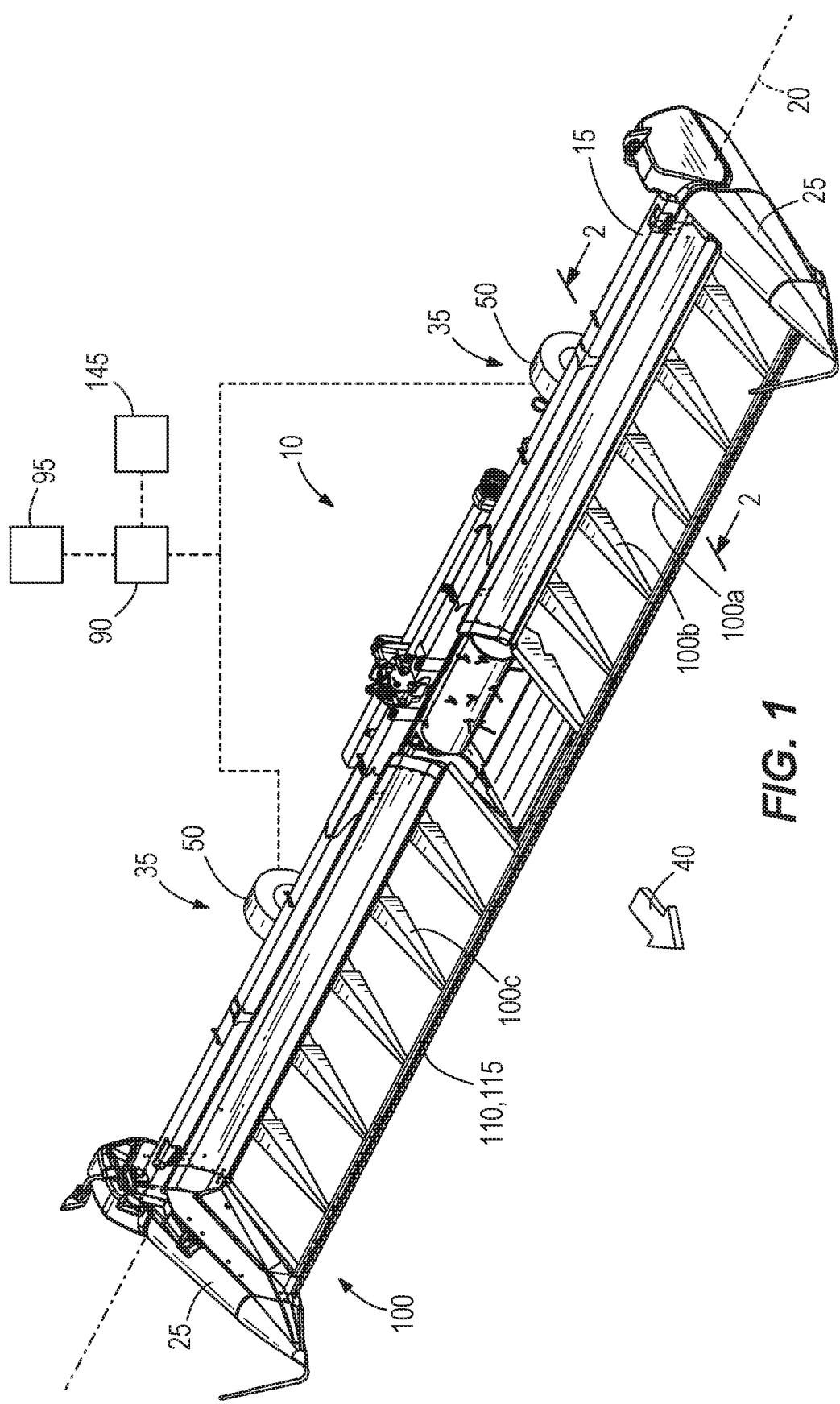
FIG. 1 is a perspective view of an agricultural harvesting head unit.

FIG. 1 illustrates a harvesting head unit 10 for an agricultural combine harvester. The head unit 10 unit includes a frame 15 having a longitudinal axis 20 extending between side housings 25 of the frame 15. The head unit 10 is moveable along a surface 30 that supports the agricultural combine harvester.

The head unit 10 also includes gauge assemblies (e.g., gauge wheel assemblies 35) coupled to a rear side of the frame 15 in a travel direction 40 of the head unit 10. In particular, the gauge wheel assemblies 35 are pivotably coupled to the frame 15 about a gauge member axis 45 (FIG. 2) to be selectively engageable with the surface 30. Each gauge wheel assembly 35 includes a wheel 50 coupled to a support bracket 55, which is pivotably coupled to the frame 15 about the gauge member axis 45. In other embodiments, the head unit 10 can include one gauge wheel assembly 35 or more than two gauge wheel assemblies 35.

Figure 2:
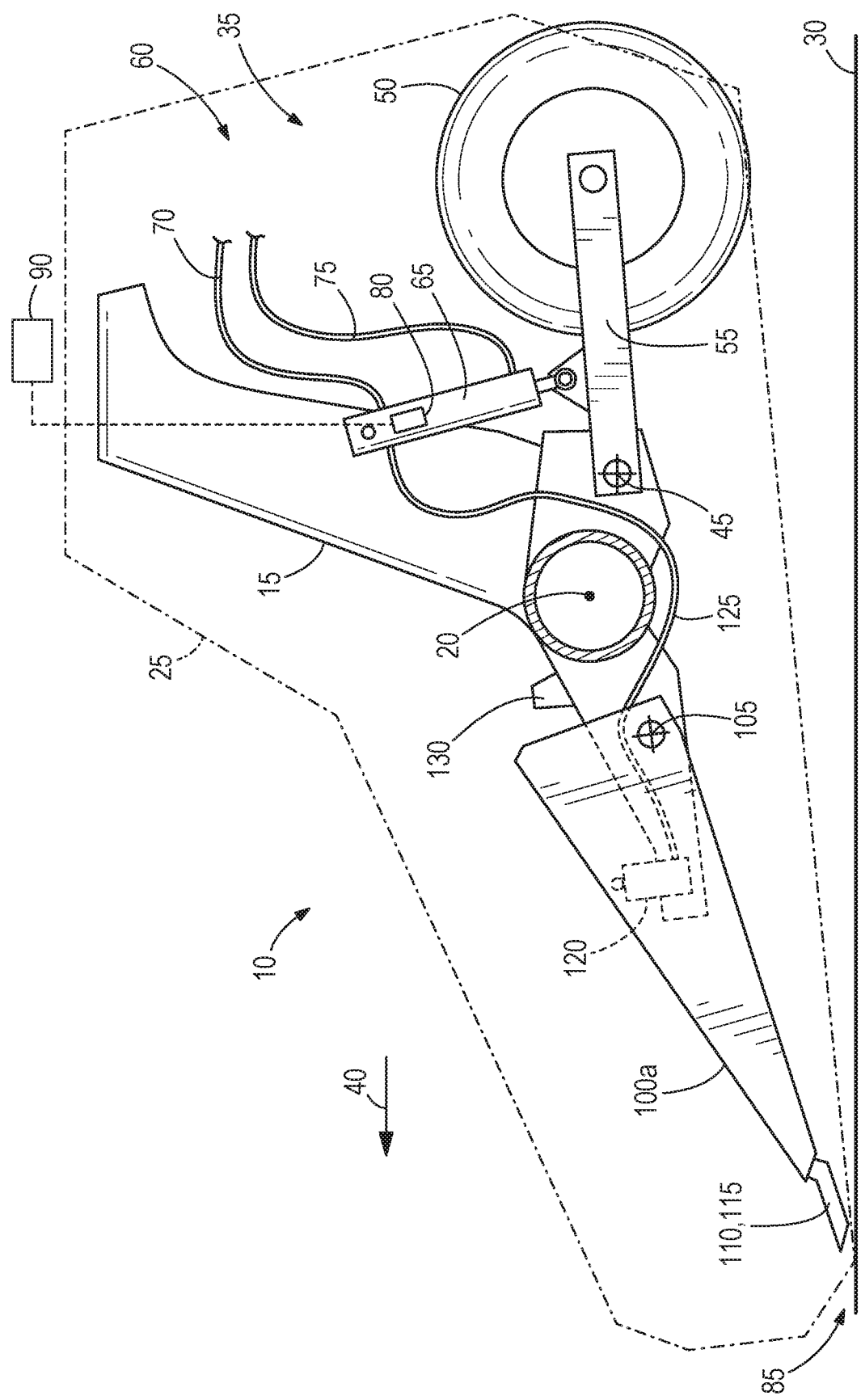
FIG. 2 is a cross sectional view of the agricultural harvesting head unit taken along section line 2-2 of FIG. 1 illustrating a hydraulic locking assembly according to one embodiment of the disclosure with a frame of the agricultural harvesting head unit engaging a surface and a gauge assembly being spaced from the surface.

With reference to FIG. 2, a control assembly 60 (e.g., a hydraulic locking assembly) includes a first hydraulic actuator 65 (e.g., a first hydraulic cylinder) coupled to the frame 15 and the support bracket 55. A first hydraulic line 70 is coupled to the first hydraulic actuator 65 and operable to introduce hydraulic fluid into the first hydraulic actuator 65 for the gauge wheel assembly 35 to move from a retracted position (FIG. 2) in which the wheel 50 is spaced from the surface 30 into an extended position (FIGS. 3 and 4) in which the wheel 50 is engaged with the surface 30. A second hydraulic line 75 is also coupled to the first hydraulic actuator 65 and is operable to introduce hydraulic fluid into the first hydraulic actuator 65 for the gauge wheel assembly 35 to move from the extended position into the retracted position.

Figure 4:
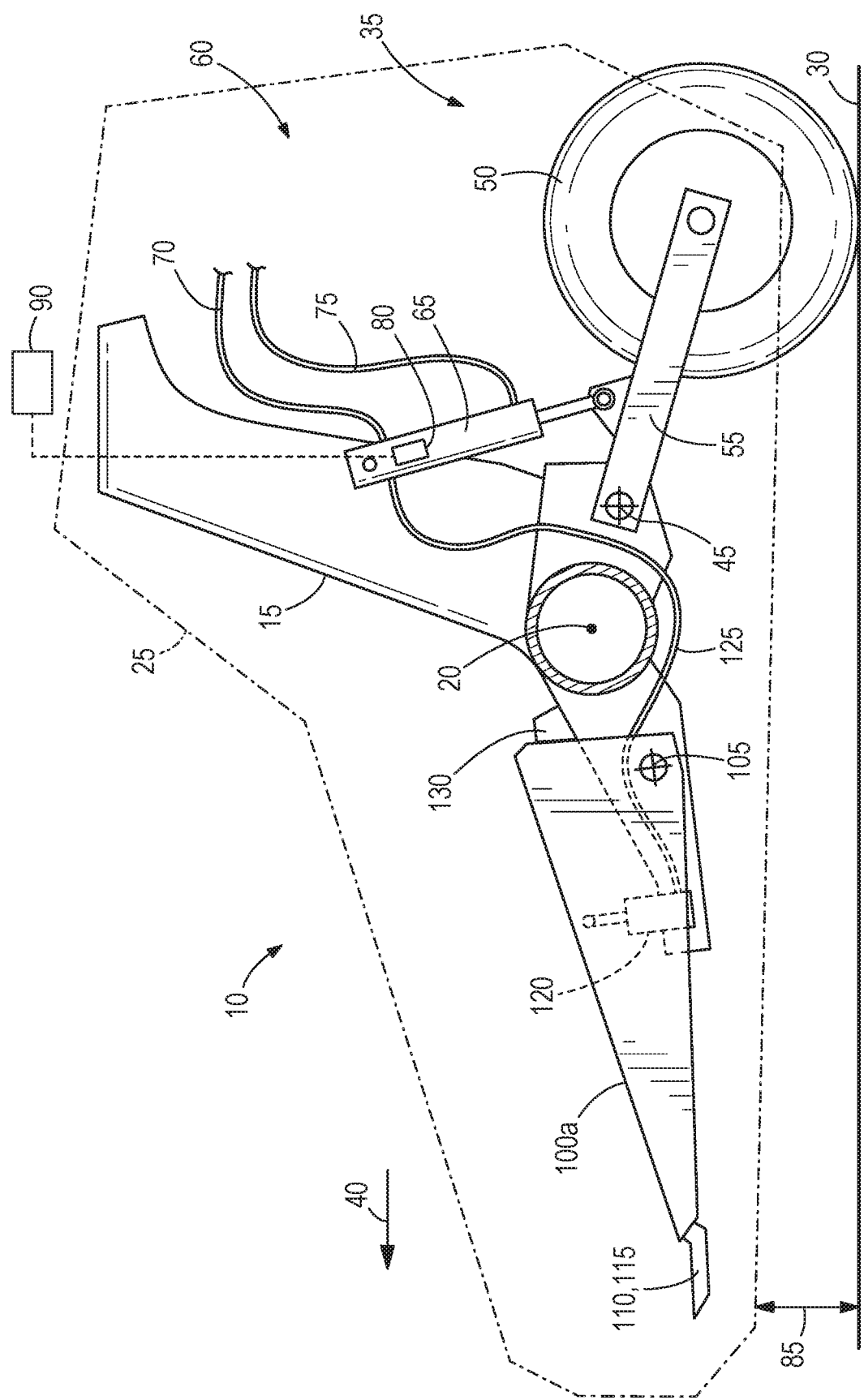
FIG. 4 is a cross sectional view of the agricultural harvesting head unit taken along section line 2-2 of FIG. 1 illustrating the hydraulic locking assembly with the frame of the agricultural harvesting head unit being spaced from the surface and the gauge assembly engaging the surface.
Figure 6:
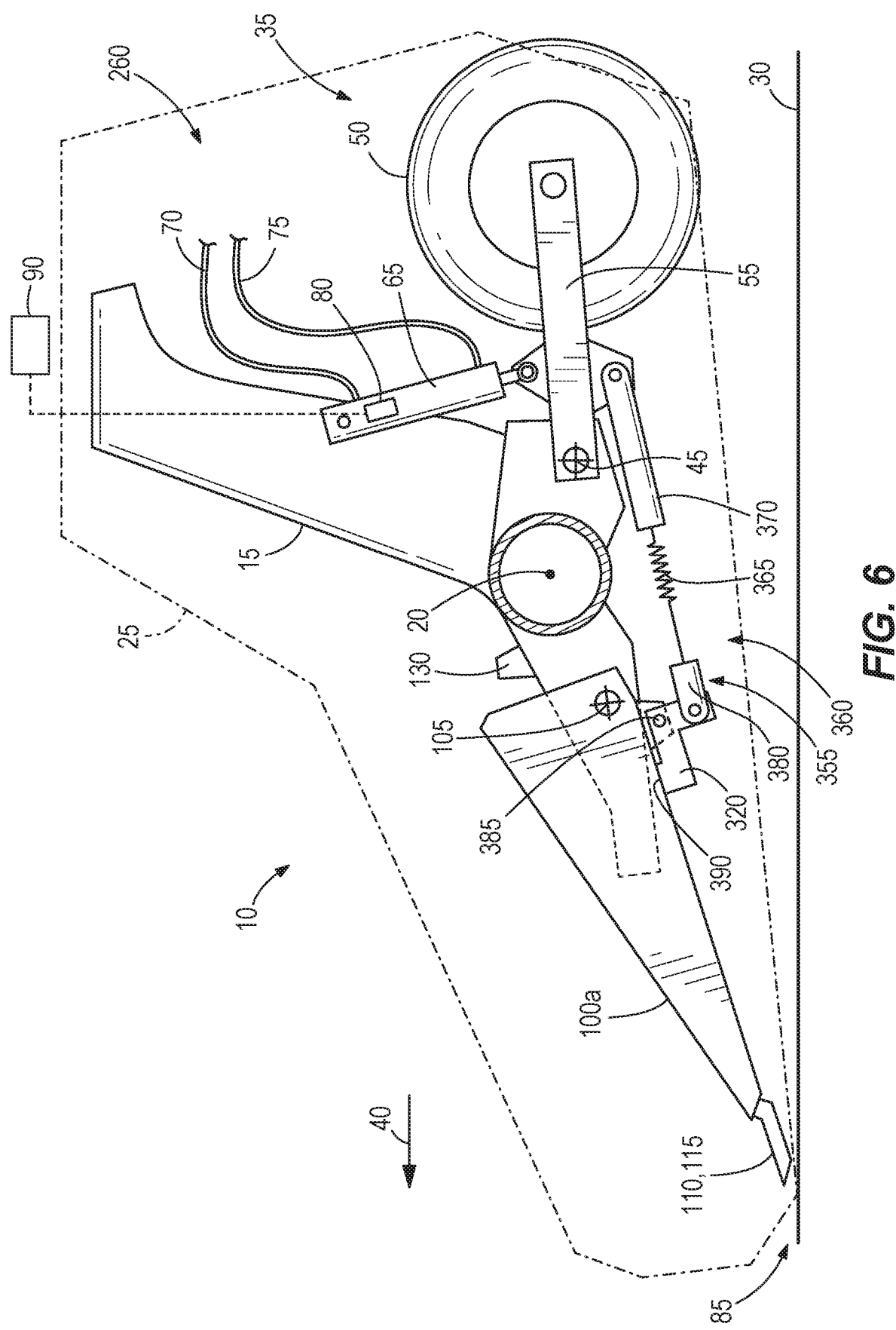
FIG. 6 is a cross sectional view of the agricultural harvesting head unit taken along section line 2-2 of FIG. 1 illustrating a mechanical locking assembly according to another embodiment of the disclosure with the frame of the agricultural harvesting head unit engaging the surface and the gauge assembly being spaced from the surface.

The control assembly 60 also includes a gauge sensor 80 coupled to at least one gauge wheel assembly 35 and is operable to measure an actual vertical position 85 of the frame 15 relative to the surface 30. In the illustrated embodiment, the gauge sensor 80 is in communication with the first hydraulic actuator 65 to monitor movement of the gauge wheel assembly 35 between the extended and retracted positions, which correlates to a position of the frame 15 relative to the surface 30. For example, the gauge sensor 80 senses when the gauge wheel 50 is spaced from the surface 30, which correlates to the harvesting head unit 10 being in a lowered position with the frame 15/side housings 25 engaging the surface 30 (e.g., the vertical position 85 is zero; FIG. 2). The gauge sensor 80 also senses when the gauge wheel 50 engages the surface 30 and senses a relative position of the gauge wheel 50/bracket 55 and the frame 15, which correlates to the harvesting head unit 10 being in a raised position with the frame 15 spaced from the surface 30 (e.g., the vertical position 85 is greater than zero; FIG. 4). In other embodiments, the sensor 85 can be coupled between the support bracket 55 and the frame 15 adjacent the gauge member axis 45 to measure angular movement of the support bracket 55 relative to the frame 15. The gauge sensor 80 is also in communication with a control processor 90 (FIG. 1), and the control processor 90 is coupled to a control actuator 95. The control actuator 95 is located within an operator cab of the agricultural combine harvester and is operable to control the gauge wheel assemblies 35 and the vertical position 85 of the head unit 10 above the surface 30, discussed in more detail below. In one embodiment, the control actuator 95 can be a rotatable dial, a user interface display, etc. in which the operator can select a desired height of the head unit 10 above the surface 30.

With reference back to FIG. 1, the head unit 10 also includes support arms 100 pivotably coupled to the frame 15 about a support arm axis 105 (FIG. 2) and are operable to support a reciprocating knife 110 having cutting teeth 115. At least one of the side housings 25 includes a drive mechanism (not shown) operable to reciprocate the knife 110 in directions along the longitudinal axis 20 of the frame 15.

With reference to FIG. 2, the control assembly 60 also includes a second hydraulic actuator 120 (e.g., a second hydraulic cylinder) coupled to the frame 15 and a first support arm 100a. The second hydraulic actuator 120 is fluidly coupled to the first hydraulic actuator 65 by a third hydraulic line 125 and is moveable between a depressurized state (FIGS. 2 and 3) and a pressurized state (FIG. 4). When the second hydraulic actuator 120 is depressurized, the first support arm 100a is in an unlocked state and is freely pivotable relative to the frame 15 about the support arm axis 105. When the second hydraulic actuator 120 is pressurized, the first support arm 100a is in a locked state and is fixed relative to the frame 15. In particular, the first support arm 100a moves into engagement with a stop 130 of the frame 15 to fix the first support arm 100a about the support arm axis 105 when the second hydraulic actuator 120 is pressurized.

With reference to FIG. 5, the control assembly 60 also includes third hydraulic actuators 135 (e.g., third hydraulic cylinders) each coupled to one of the remaining support arms 100b, 100c and the frame 15. Each third hydraulic actuator 135 is coupled to its corresponding support arm 100b, 100c and the frame 15 in a similar way the second hydraulic actuator 120 is coupled to the first support arm 100a and the frame 15. The third hydraulic actuators 135 are in communication with the second hydraulic actuator 120 by a fourth hydraulic line 140 such that the third hydraulic actuators 135 move concurrently with the second hydraulic actuator 120. For example, when the second hydraulic actuator 120 is depressurized, the third hydraulic actuators 135 are also depressurized to allow the support arms 100b, 100c to pivot about the support arm axis 105. Moreover, when the second and third hydraulic actuators 120, 135 are in the depressurized state, the support arms 100a, 100b, 100c are independently moveable relative to each other. When the second hydraulic actuator 120 is pressurized, the third hydraulic actuators 135 are also pressurized to fix the support arms 100b, 100c relative to the frame 15.

Figure 3:
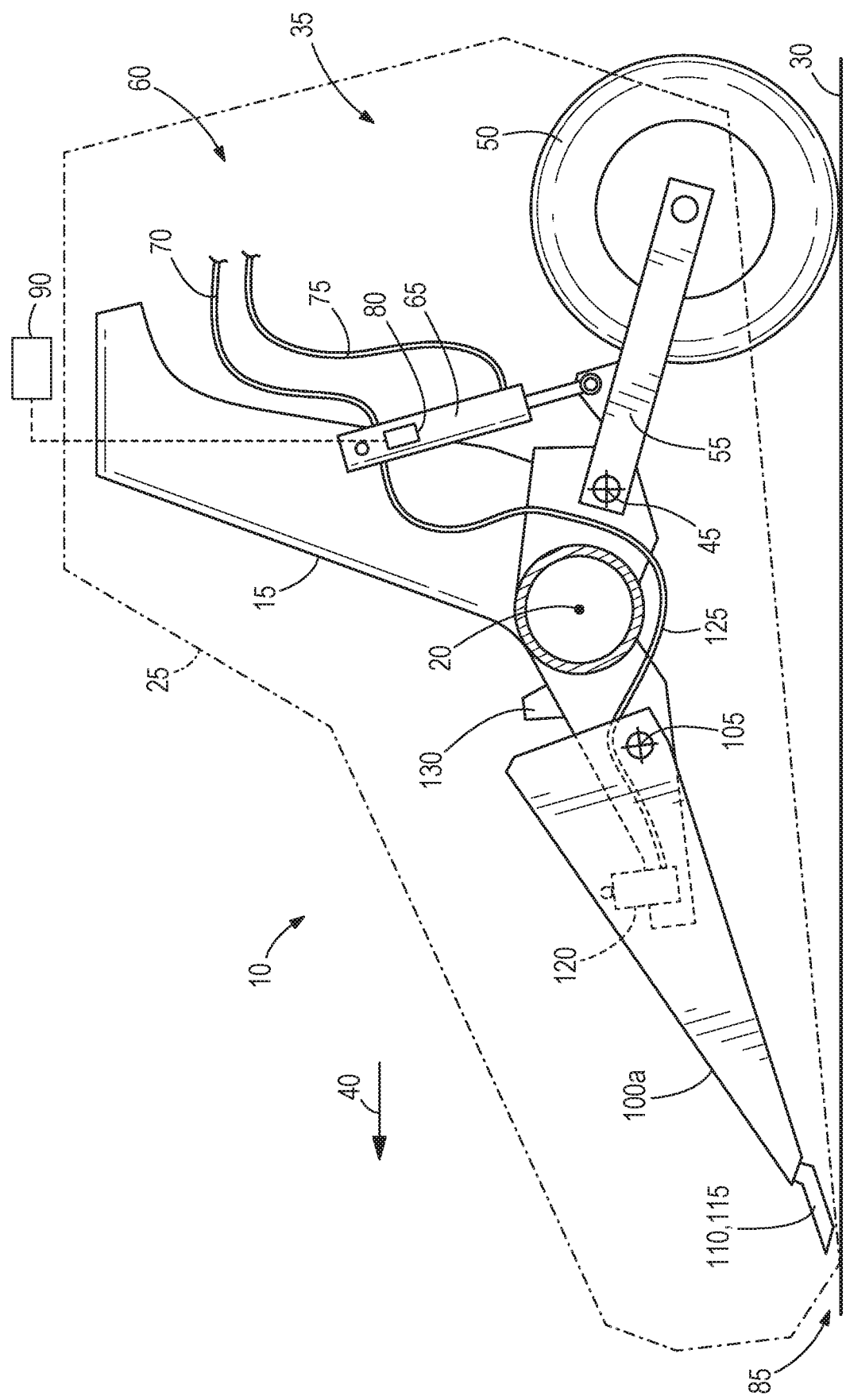
FIG. 3 is a cross sectional view of the agricultural harvesting head unit taken along section line 2-2 of FIG. 1 illustrating the hydraulic locking assembly with the frame of the agricultural harvesting head unit and the gauge assembly engaging the surface.

The agricultural combine harvester is operable to move the head unit 10 between a lowered position in which the frame 15 engages the surface 30 (e.g., the vertical position 85 is zero; FIGS. 2 and 3) and a raised position in which the frame 15 is spaced from the surface 30 (e.g., the vertical position 85 is greater than zero; FIG. 4). In particular, the agricultural combine harvester includes a hydraulic system 145 (FIG. 1) in communication with the control processor 90 to move the head unit 10 between the lowered and raised positions. In the lowered position, the side housings 25 engage the surface 30 to position the knife 110 relatively close to the surface 30 (e.g., the cutting teeth 115 are positioned within about 3 inches from the surface 30). In other words, the side housings 25 at least partially support the head unit 10 above the surface 30 when in the lowered position. Moreover, the control processor 90 is able to identify when the head unit 10 is in the lowered position by a signal provided from the gauge sensor 80. For example, when the wheel 50 is spaced from the surface 30 (FIG. 2), the gauge sensor 80 measures a first position of the first hydraulic actuator 65 representing the wheel 50 being out of engagement with the surface 30 and the head unit 10 being in the lowered position. When the wheel 50 and the side housings 25 are in engagement with the surface 30 (FIG. 3), the gauge sensor 80 measures a second position of the first hydraulic actuator 65 representing the wheel 50 initially engaging the surface 30 but the head unit 10 still being in the lowered position as the side housings 25 are also in engagement with the surface 30. The first hydraulic actuator 65 moves from the first position (FIG. 2) to the second position (FIG. 3) in response to an operator of the combine harvester actuating the control actuator 95 thereby having hydraulic fluid pumped into the first hydraulic actuator 65 via the first hydraulic line 70. In some embodiments, the first hydraulic actuator 65 can be maintained in the first position (FIG. 2) by hydraulic fluid entering the first hydraulic actuator 65 via the second hydraulic line 75. In further embodiments, the first hydraulic actuator 65 can be biased toward the first position (FIG. 2) by a biasing member (e.g., a spring) to maintain the gauge wheel 50 out of engagement with the surface 30. In yet further embodiments, the first hydraulic actuator 65 can be freely moveable (e.g., depressurized) such that the wheel 50 engages the surface 30 and is freely pivotable about the gauge wheel axis 45 as the head unit 10 is in the lowered position. Furthermore, the second and third hydraulic actuators 120, 135 are depressurized when the head unit 10 is in the lowered position.

As the head unit 10 moves along the surface 30, the independent movement of the support arms 100a, 100b, 100c allow the knife 110 to bend along the longitudinal axis 20 of the frame 15 while the knife 110 reciprocates along the longitudinal axis 20. For example, portions of the knife 110 are allowed to flex as each support arm 100 moves over uneven contours of the surface 30. This allows for the cutting teeth 115 to remain relatively close to the uneven surface 30 without digging in or engaging the surface 30. As such, plant matter (e.g., crops such as corn stalks, bean stalks, etc.) extending above the surface 30 can be cut relatively close to the surface 30 by the knife 110 while the head unit 10 is in the lowered position.

In some situations, it is desirable to lock the knife 110 from bending and position the head unit 10 in the raised position. To do this, the operator of the agricultural combine harvester selects a desired height of the head unit 10 above the surface 30 via the control actuator 95, and the control processor 90 determines the actual height of the head unit 10 above the surface by the gauge sensor 80 such that the control processor 90 can control the hydraulic system 145 to raise the head unit 10 to the desired height. In addition, the control assembly 60 locks the support arms 100 in the locked state to inhibit bending of the knife 110.

In particular, hydraulic fluid is pumped into the first hydraulic actuator 65 upon selecting the desired height of the head unit 10 via the control actuator 95. As such, the first hydraulic actuator 65 is pressurized to push the gauge wheel 50 toward the surface 30, and the second and third hydraulic actuators 120, 135 are also pressurized via the hydraulic lines 125, 140 to move the support arms 100 into the locked position. As such, the control assembly 60 provides simultaneous movement of the gauge wheel assemblies 35 and support arms 100 as the hydraulic system 145 raises the head unit 10 to the desired height. In other embodiments, the control assembly 60 can separately move the gauge wheel assemblies 35 and the support arms 100. For example, the support arms 100 can be moved into the locked state before the head unit 10 moves into the raised position. In some embodiments, the first hydraulic actuator 65 can assist the hydraulic system 145 raise the head unit 10 above the surface 30 such that the gauge wheel assemblies 35 can at least partially support the weight of the frame 15.

Once the support arms 100 are in the locked state, the knife 110 is inhibited from bending along the longitudinal axis 20 of the frame 15. This enables the cutting teeth 115 to simply reciprocate along the longitudinal axis 20 of the frame 15 to shear plant matter at a desired height above the surface 30.

To move the head unit 10 back into the lowered position (FIG. 3), the control actuator 95 is actuated for the hydraulic system 145 to lower the frame 15. Pressure within the first hydraulic actuator 65 is also reduced allowing the gauge assemblies 35 to move relative to the frame 15 as the head unit 10 is being lowered. Once the frame 15 engages the surface 30, pressure within the second and third hydraulic actuators 120, 135 are also reduced for the support arms 100 to return to the unlocked state. As described above, the gauge wheel assemblies 35 can remain engaged with the surface 30 but are freely pivotable (FIG. 3) or the gauge wheel assemblies 35 can be moved out of engagement with the surface 30 (FIG. 2) when the support arms 100 move into the unlocked state.

In sum, the control assembly 60 moves the support arms 100 into the locked position (FIG. 4) based on the vertical position 85 of the head unit 10 being non-zero with the vertical position 85 being measured by the gauge assembly 35. The gauge assembly 35 is within a certain range of positions relative to the frame 15 when the head unit 10 is in a raised position. The control assembly 60 also allows the support arms 100 to move into the unlocked position (FIGS. 2 and 3) based on the vertical position 85 of the head unit 10 being zero. The gauge assembly 35 is within a different range of positions relative to the frame 15 when the head unit 10 is in the lowered position.

In further embodiments, at least one gauge wheel assembly 35 can be replaced with a rigid probe pivotably coupled to the frame 15 about the gauge member axis 45 and biased into engagement with the surface 30 by, for example, a torsion spring. The gauge sensor 80 is coupled to the probe to measure an angular position of the probe relative to the frame 15 about the gauge member axis 45 to determine a position of the head unit 10 relative to the surface 30. Accordingly, the probe is in a first range of angular positions relative to the frame 15 when the head unit 10 is in the lowered position (FIGS. 2 and 3), and the probe is within a second range of angular positions relative to the frame 15 when the head unit 10 is in the raised position (FIG. 4). In yet further embodiments, at least one gauge wheel assembly 35 can be replaced with an optic sensor to measure a height of the frame 15 relative to the surface 30.

FIGS. 6-9 illustrate a control assembly 260 (e.g., a mechanical locking assembly) according to another embodiment. The control assembly 260 is similar to the control assembly 60; therefore, similar components are designated with similar references numbers each incremented by 200. At least some differences and/or at least some similarities between the control assemblies 60, 260 will be discussed in detail below. In addition, components or features described with respect to only one or some of the embodiments described herein are equally applicable to any other embodiments described herein.

The control assembly 260 omits the second and third hydraulic actuators 120, 135, and includes a linkage assembly 355 (FIG. 6) coupled between at least one gauge wheel assembly 35 and the support arms 100. However, the linkage assembly 355 functions similar to the second and third hydraulic actuators 120, 35 in that the linkage assembly 355 moves the support arms 100 into the locked state. The linkage assembly 355 includes a first linkage member 360 having a biasing member 365 and a first portion 370 with the first portion 370 being pivotably coupled to the support bracket 55 of the gauge wheel assembly 35. A first mechanical actuator 320 (e.g., a bell crank) of the linkage assembly 355 is coupled to a second portion 380 of the first linkage member 360. The first mechanical actuator 320 is pivotably coupled to the frame 15 about an actuator axis 385 and includes a surface 390 engageable with the first support arm 100a.

With reference to FIG. 9, the linkage assembly 355 also includes second mechanical actuators 335 pivotably coupled to the frame 15 about the actuator axis 385 with each second mechanical actuator 335 associated with one support arm 100b, 100c. A mechanical coupler 340 is coupled to the first and second mechanical actuators 320, 335 to provide concurrent movement of the first and second mechanical actuators 320, 335.

With reference back to FIG. 6, the head unit 10 is in the lowered position with the frame 15 engaging the surface 30 and the gauge wheel assembly 35 spaced from the surface 30. In the lowered position, the linkage assembly 355 is arranged such that the first and second mechanical actuators 320, 335 allow the support arms 100 to independently pivot. In one embodiment, the biasing member 365 biases the gauge wheel 35 out of engagement with the surface 30 when the head unit 10 is in the lowered position.

Figure 7:
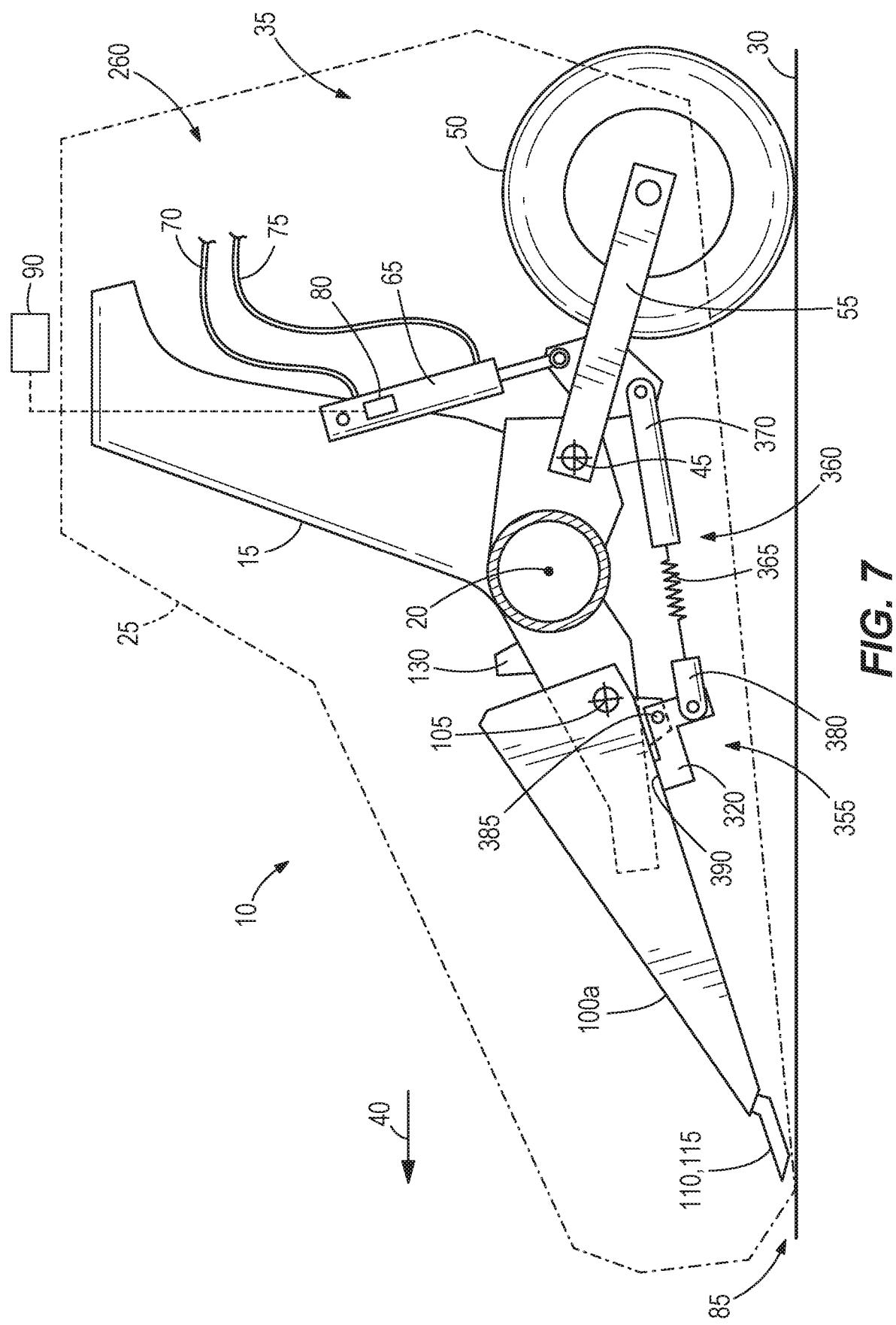
FIG. 7 is a cross sectional view of the agricultural harvesting head unit taken along section line 2-2 of FIG. 1 illustrating the mechanical locking assembly with the frame of the agricultural harvesting head unit and the gauge assembly engaging the surface.
Figure 8:
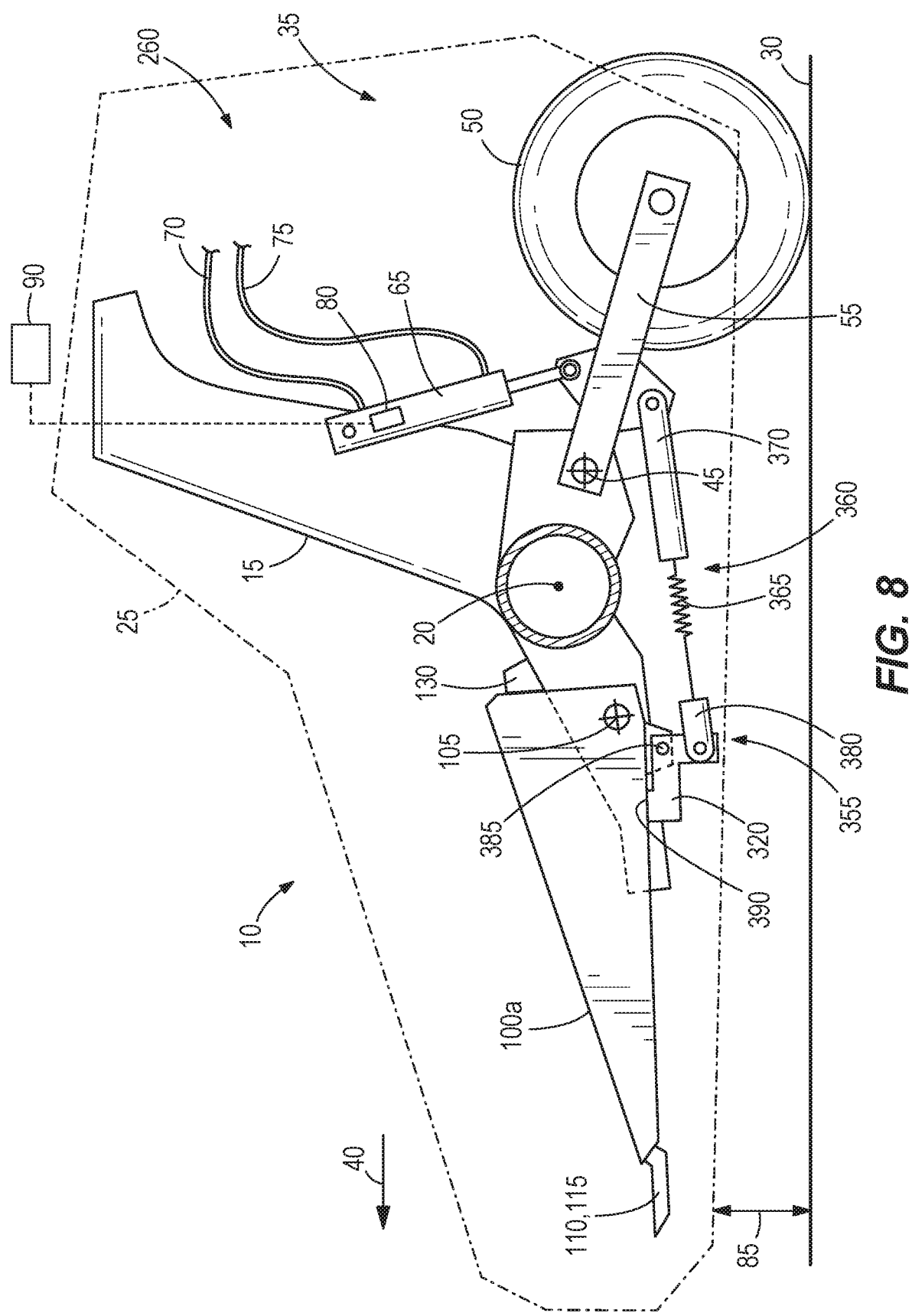
FIG. 8 is a cross sectional view of the agricultural harvesting head unit taken along section line 2-2 of FIG. 1 illustrating the mechanical locking assembly with the frame of the agricultural harvesting head being spaced from the surface and the gauge assembly engaging the surface.

With actuation of the control actuator 95 to move the head unit 10 into a raised position, the first hydraulic actuator 65 is pressurized to move the gauge wheel 50 into engagement with the surface 30 (FIG. 7). The first linkage member 360 includes the biasing member 365 to allow for relative movement of the first and second portions 370, 380 so that the first and second mechanical actuators 320, 335 do not move the support arms 100 into the locked state before the gauge wheel 50 engages the surface 30. Once the gauge wheel 50 engages the surface 30 (FIG. 7), the first linkage member 360 can then move the first and second mechanical actuators 320, 335 about the actuator axis 385 to move the support arms 100 into the locked state (FIG. 8) as the hydraulic system 145 raises the head unit 10 from the lowered position. In other words, the control assembly 260 moves the support arms 100 into the locked position based on the vertical position 85 of the head unit 10.

To lower the head unit 10 back into engagement with the surface 30, the hydraulic system 145 lowers the head unit 10 and pressure within the first hydraulic actuator 65 is released allowing movement of the gauge wheel assemblies 35 relative to the frame 15. Once the frame 15 engages the surface 30 again, the first linkage member 360 allows the first and second mechanical actuators 320, 335 to pivot about the actuator axis 385 for the support arms 100 to return to the unlocked state.

In other embodiments, the control assembly 260 can also include the second and third hydraulic actuators 120, 135 for the support arms 100 to be independently controlled relative to the first linkage member 360.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A harvesting head for an agricultural combine, the agricultural combine supported on a surface, the harvesting head comprising:
   a frame configured to move between a raised position in which the frame is spaced from the surface and a lowered position in which the frame engages the surface;
   a support arm coupled to the frame, the support arm configured to move between an unlocked state in which the support arm is pivotable relative to the frame and a locked state in which the support arm is fixed relative to the frame;
   cutting teeth supported by the support arm relative to the frame, the cutting teeth configured to move relative to the support arm in a reciprocating motion along a longitudinal axis of the frame;
   a gauge member coupled to the frame, the gauge member configured to engage the surface and position a height of the frame relative to the surface; and
   a control assembly configured to move the gauge member relative to the frame, the control assembly also configured to move the support arm into the locked state based on a position of the gauge member relative to the frame,
   wherein the control assembly includes a first hydraulic actuator coupled to the gauge member and the frame and configured to move the gauge member relative to the frame, wherein the control assembly also includes a second hydraulic actuator coupled to the support arm and the frame and configured to move the support arm into the locked state, and wherein the second hydraulic actuator is configured to be actuated by the first hydraulic actuator to move the support arm relative to the frame.

2. The harvesting head of claim 1, wherein the support arm is a first support arm of a plurality of support arms, wherein a third hydraulic actuator is coupled to a second support arm of the plurality of support arms, wherein the third hydraulic actuator is in communication with the second hydraulic actuator of the first support arm, and wherein the third hydraulic actuator is configured to be actuated by the second hydraulic actuator to inhibit movement of the second support arm of the plurality of support arms relative to the frame.

3. The harvesting head of claim 1, wherein the support arm is pivotably coupled to the frame about a pivot axis, and wherein the second hydraulic actuator is engageable with the support arm at a position between the pivot axis and the cutting teeth in a direction transverse to the longitudinal axis of the frame.

4. The harvesting head of claim 3, wherein the second hydraulic actuator is operable to move the support arm into engagement with a stop of the frame when in the locked state, and wherein the pivot axis is positioned between the stop and the second hydraulic actuator in the direction transverse to the longitudinal axis of the frame.

5. A harvesting head for an agricultural combine, the agricultural combine supported on a surface, the harvesting head comprising:
   a frame;
   a support arm pivotably coupled to the frame about a pivot axis, the support arm configured to move between an unlocked state in which the support arm is moveable relative to the frame and a locked state in which the support arm is fixed relative to the frame;

cutting teeth supported by the support arm relative to the frame, the cutting teeth configured to move relative to the support arm in a reciprocating motion along a longitudinal axis of the frame;

a gauge member coupled to the frame, the gauge member configured to position a height of the frame relative to the surface; and a control assembly including a portion engageable with the support arm at a position between the pivot axis and the cutting teeth in a direction transverse to the longitudinal axis of the frame, the portion of the control assembly configured to move the support arm into the locked state based on the height of the frame relative to the surface.

6. The harvesting head of claim 5, wherein the control assembly includes a first hydraulic actuator coupled to the gauge member and the frame, and wherein the first hydraulic actuator is configured to move the gauge member relative to the frame.

7. The harvesting head of claim 6, wherein the portion of the control assembly includes a second hydraulic actuator coupled to the support arm and the frame, and wherein the second hydraulic actuator is configured to be actuated by the first hydraulic actuator.

8. The harvesting head of claim 7, wherein the support arm is a first support arm of a plurality of support arms, wherein a second support arm of the plurality of support arms includes a third hydraulic actuator in communication with the second hydraulic actuator of the first support arm, and wherein the third hydraulic actuator is configured to be actuated by the second hydraulic actuator.

9. The harvesting head of claim 6, wherein the portion of the control assembly includes a first linkage coupled between the support arm and the gauge member, and wherein the first linkage is configured to move the support arm into the locked state based on actuation of the first hydraulic actuator.

10. The harvesting head of claim 9, wherein the support arm is a first support arm of a plurality of support arms, wherein the control assembly includes a second linkage coupled between the first support arm and a second support arm of the plurality of support arms, wherein the second linkage is configured to move the second support arm into a locked state in which the second support arm is fixed relative to the frame based on the first linkage moving the first support arm into the locked state.

11. The harvesting head of claim 5, wherein the gauge member includes a gauge wheel pivotably coupled relative to the frame.

12. The harvesting head of claim 5, wherein the portion of the control assembly is operable to move the support arm into engagement with a stop of the frame when in the locked state, and wherein the pivot axis is positioned between the stop and the portion of the control assembly in the direction transverse to the longitudinal axis of the frame.

13. The harvesting head of claim 12, wherein the control assembly includes a first hydraulic actuator coupled to the gauge member and the frame, and wherein the first hydraulic actuator is configured to move the gauge member relative to the frame.

14. The harvesting head of claim 13, wherein the portion of the control assembly includes a second hydraulic actuator coupled to the support arm and the frame, and wherein the second hydraulic actuator is configured to be actuated by the first hydraulic actuator.

15. The harvesting head of claim 13, wherein the portion of the control assembly includes a first linkage coupled between the support arm and the gauge member, and wherein the first linkage is configured to move the support arm into the locked state based on actuation of the first hydraulic actuator.

16. The harvesting head of claim 13, wherein the portion of the control assembly is a first portion and the support arm is a first support arm of a plurality of support arms, wherein a second support arm of the plurality of support arms includes a second portion of the control assembly in communication with the first portion of the control assembly, and wherein the second portion of the control assembly is configured to be actuated by the first portion of the control assembly.

17. A harvesting head for an agricultural combine, the agricultural combine supported on a surface, the harvesting head comprising:

a frame;

a support arm coupled to the frame, the support arm configured to move between an unlocked state in which the support arm is moveable relative to the frame and a locked state in which the support arm is fixed relative to the frame;

cutting teeth supported by the support arm relative to the frame, the cutting teeth configured to move relative to the support arm in a reciprocating motion along a longitudinal axis of the frame;

a gauge member coupled to the frame, the gauge member configured to engage the surface and position a height of the frame relative to the surface; and a control assembly configured to move the support arm into the locked state based on a position of the gauge member relative to the frame, wherein the control assembly includes a first hydraulic actuator coupled to the gauge member and the frame and configured to move the gauge member relative to the frame, wherein the control assembly includes a first linkage coupled between the support arm and the gauge member and configured to move the support arm into the locked state based on actuation of the first hydraulic actuator.

18. The harvesting head of claim 17, wherein the support arm is a first support arm of a plurality of support arms, wherein the control assembly includes a second linkage coupled between the first support arm and a second support arm of the plurality of support arms, wherein the second linkage is configured to move the second support arm into a locked state in which the second support arm is fixed relative to the frame based on the first linkage moving the first support arm into the locked state.

19. The harvesting head of claim 17, wherein the support arm is pivotably coupled to the frame about a pivot axis, and wherein the first linkage is engageable with the support arm at a position between the pivot axis and the cutting teeth in a direction transverse to the longitudinal axis of the frame.

20. The harvesting head of claim 19, wherein the first linkage is operable to move the support arm into engagement with a stop of the frame when in the locked state, and wherein the pivot axis is positioned between the stop and the first linkage in the direction transverse to the longitudinal axis of the frame.

* * * * *